(12) United States Patent
Jaworowski et al.

(10) Patent No.: US 8,883,368 B2
(45) Date of Patent: Nov. 11, 2014

(54) SOLID OXIDE FUEL CELL HAVING RIGIDIZED SUPPORT INCLUDING NICKEL-BASED ALLOY

(75) Inventors: Mark R. Jaworowski, Glastonbury, CT (US); Jean Yamanis, South Glastonbury, CT (US)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 13/127,297

(22) PCT Filed: Nov. 21, 2008

(86) PCT No.: PCT/US2008/084262
§ 371 (c)(1),
(2), (4) Date: May 3, 2011

(87) PCT Pub. No.: WO2010/059160
PCT Pub. Date: May 27, 2010

(65) Prior Publication Data
US 2011/0207020 A1    Aug. 25, 2011

(51) Int. Cl.
*H01M 8/02* (2006.01)
*H01M 8/12* (2006.01)

(52) U.S. Cl.
CPC .......... *H01M 8/1206* (2013.01); *H01M 8/0232* (2013.01); *H01M 8/021* (2013.01); *Y02E 60/521* (2013.01); *Y02E 60/525* (2013.01); *H01M 8/0208* (2013.01)
USPC .......................................... 429/488; 429/514

(58) Field of Classification Search
USPC ......................................... 429/488, 514, 522
See application file for complete search history.

(56) References Cited

U.S. PATENT DOCUMENTS

| 5,279,906 | A | 1/1994 | Yoshimura et al. |
| 5,358,735 | A | 10/1994 | Kawasaki et al. |
| 5,527,633 | A | 6/1996 | Kawasaki et al. |
| 5,580,672 | A | 12/1996 | Zagaja, III et al. |
| 5,932,055 | A | 8/1999 | Newell et al. |
| 6,106,967 | A | 8/2000 | Virkar et al. |
| 6,280,868 | B1 | 8/2001 | Badwal et al. |
| 6,326,096 | B1 | 12/2001 | Virkar et al. |
| 6,770,395 | B2 | 8/2004 | Virkar et al. |
| 7,977,004 | B2 | 7/2011 | Warrier et al. |
| 2002/0107140 | A1* | 8/2002 | Hampden-Smith et al. .. 502/185 |
| 2004/0200187 | A1 | 10/2004 | Warrier et al. |

(Continued)

FOREIGN PATENT DOCUMENTS

WO    2007093759    8/2007

OTHER PUBLICATIONS

Search Report and Written Opinion mailed on Jun. 25, 1999 for PCT/US2008/084262.

(Continued)

*Primary Examiner* — Mark F Huff
*Assistant Examiner* — Monique Wills
(74) *Attorney, Agent, or Firm* — Seed IP Law Group PLLC

(57) ABSTRACT

A fuel cell includes a separator sheet and a perforated support sheet connected to the separator sheet. The perforated support sheet and separator sheet are comprised of a nickel-based alloy. A porous layer is located between the separator sheet and the support sheet and provides an electrical connection between the separator sheet and the support sheet.

19 Claims, 1 Drawing Sheet

(56) References Cited

U.S. PATENT DOCUMENTS

| | | | |
|---|---|---|---|
| 2004/0253512 A1* | 12/2004 | Watanabe et al. | 429/210 |
| 2005/0221163 A1 | 10/2005 | Yang et al. | |
| 2007/0160892 A1 | 7/2007 | Yamada et al. | |
| 2008/0070084 A1 | 3/2008 | Ishihara et al. | |
| 2008/0096080 A1 | 4/2008 | Batawi et al. | |
| 2008/0107948 A1 | 5/2008 | Yamanis | |
| 2008/0206605 A1* | 8/2008 | Perry et al. | 429/12 |
| 2009/0226786 A1* | 9/2009 | Selcuk et al. | 429/30 |
| 2010/0035157 A1* | 2/2010 | Nakamura | 429/304 |
| 2011/0223470 A1* | 9/2011 | Tomantschger | 429/163 |

OTHER PUBLICATIONS

International Preliminary Report on Patentability mailed on Jun. 3, 2011 for PCT/US2008/084262.

* cited by examiner

US 8,883,368 B2

SOLID OXIDE FUEL CELL HAVING RIGIDIZED SUPPORT INCLUDING NICKEL-BASED ALLOY

STATEMENT REGARDING FEDERALLY SPONSORED RESEARCH

The U.S. Government may have certain rights in this disclosure, as provided for under Contract No. NN-CO6CA45C awarded by the National Aeronautics and Space Administration.

This application is a national stage entry of PCT/US08/84262, International Filing Date: Nov. 21, 2008.

BACKGROUND OF THE DISCLOSURE

This disclosure relates to solid oxide fuel cells and, more particularly, to a rigidized foil support that provides long life and resistance to oxidation.

Solid oxide fuel cells are commonly known and used for generating electricity. For example, a solid oxide fuel cell typically includes an anode, a cathode, and an electrolyte between the anode and cathode. A support structure mechanically supports the anode, the cathode, and the electrolyte. In some examples, the support structure also serves to supply reactant gas to the anode and conduct electric current to an external circuit.

One problem associated with such support structures is that the operating environment is severely corrosive. For instance, the support structure is exposed on one side to a reactant gas oxidant and on another side to a reactant gas fuel. The exposure to the oxidant and the fuel creates an oxidizing environment that can rapidly corrode common support structure alloys. Conventional support structures are formed of stainless steel, which is generally corrosion resistant. However, under such harsh conditions, even stainless steel may corrode within a relatively short time, thereby diminishing the mechanical strength and electrical conductivity of the support structure.

SUMMARY OF THE DISCLOSURE

An example fuel cell includes a separator sheet and a perforated support sheet connected to the separator sheet. The perforated support sheet and separator sheet are comprised of a nickel-based alloy. A porous layer is located between the separator sheet and the support sheet and provides an electrical connection between the separator sheet and the support sheet.

In another aspect, an example fuel cell includes an electrode having a solid oxide electrolyte between an anode and a cathode, an innerconnect layer, and a rigidized foil support between the electrode and the innerconnect layer. The rigidized foil support includes the separator sheet, the perforated support sheet, and the porous layer as described above.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
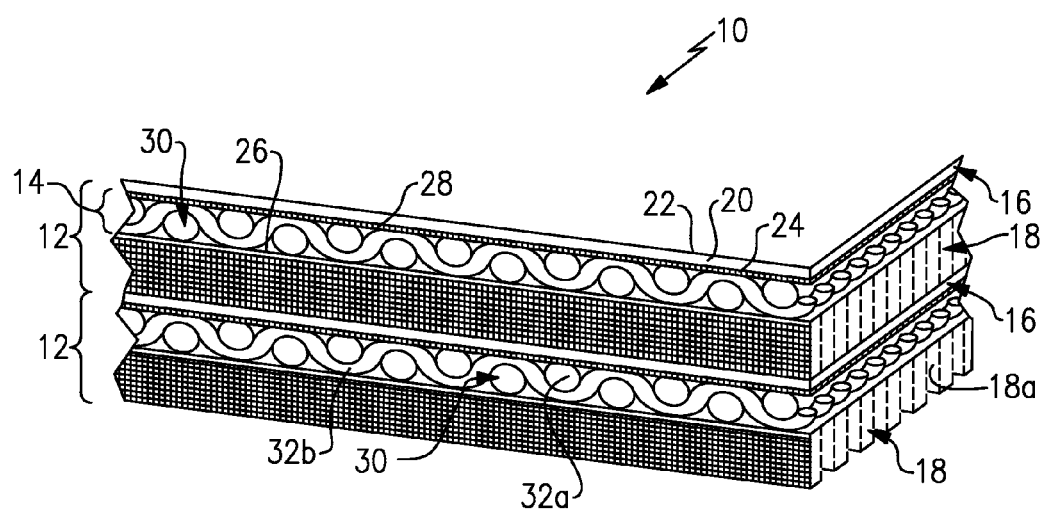
FIG. 1 illustrates an example fuel cell.

FIG. 1 schematically illustrates selected portions of an example fuel cell 10. In this example, the fuel cell 10 includes a stack of fuel cell units 12 that operate in a known manner to generate electricity. For instance, the fuel cell units 12 may be sandwiched between collector plates (not shown) in an electrically series arrangement with an external circuit. However, it is to be understood that this disclosure is not limited to the arrangement of the example fuel cell 10, and the concepts disclosed herein may be applied to other fuel cell arrangements.

In the illustrated example, each of the fuel cell units 12 includes a rigidized foil support 14 sandwiched between an electrode 16 and a cathode innerconnect layer 18. The electrode 16 may be a tri-layered arrangement, including a solid oxide electrolyte 20 sandwiched between a cathode 22 and an anode 24 for providing an electrochemical reaction generating an electric current.

The solid oxide electrolyte 20 may be any type of solid oxide electrolyte. In a few non-limiting examples, the solid oxide electrolyte may be ceria ($CeO_2$) doped with rare earth metal oxide(s), gallate (e.g., strontium-doped lanthanum gallate), or stabilized (fully or partially) zirconia.

The cathode innerconnect layer 18 may include channels 18a, such as channels formed from a corrugated sheet of expanded metal. In other examples, the cathode interconnect layer 18 may be a porous structure, such as a woven filament structure. The cathode interconnect layer 18 may be bonded to the electrode 16 by means of electron conducting materials selected from the group of metal and ceramic and mixtures thereof. The cathode interconnect layer 18 may also be bonded to the separator sheet 26 by means of diffusion bonding, welding, or brazing. The cathode interconnect layer 18 may be fabricated from a suitable alloy, such as stainless steel or a nickel-based alloy.

The rigidized foil support 14 includes a separator sheet 26, a perforated support sheet 28 adjacent to the electrode 16, and a porous layer 30 located between the separator sheet 26 and the perforated support sheet 28 and providing an electrical connection between the separator sheet 26 and the perforated support sheet 28. The separator sheet 26, the perforated support sheet 28, and the porous layer 30 may be bonded together using diffusion bonding, welding, brazing, or any other suitable process, and hermetically sealed around the edges by means of welding, brazing or diffusion bonding to create a metallic seal to provide a gas-tight passage from the porous layer 30 to the perforated support sheet 28. Alternatively, a metallic joint can be created through crimping, spot welding, or other non-hermetic joining processes, with a hermetic seal achieved through local application of glazing, enameling, or ceramic adhesives. In this regard, the rigidized foil support 14 serves several functions, including mechanically supporting the electrode 16 and supplying a first reactant, such as hydrogen fuel, to the anode 24 of the electrode 16. The cathode innerconnect layer 18 supplies a second reactant, such as an oxidant, to the cathode 22 of the electrode 16. The rigidized foil support 14 is also outfitted with inlet and outlet ports for fuel fluid communication between the fuel cell units 12 in a fuel cell stack.

The perforated support sheet 28 is a thin sheet of the Ni-based alloy, such as a foil. The perforated support sheet 28 is not limited to any particular thickness, but in a few examples, the thickness may be 10-150 micrometers (394-5906 microinches). In a further example, the thickness may be approximately 15-50 micrometers (591-1969 microinches). The perforated support sheet 28 may be fabricated using any suitable method, including laser drilling, electron beam drilling, chemical etching, or micromachining. In another example, the perforated support sheet 28 may be fabricated as disclosed in PCT Application No. PCT/US2008/084254 entitled Method of Forming a Fuel Cell Sheet. The separator sheet 26 is of similar thickness as the perforated support sheet 28, but is solid and continuous rather than perforated.

The porous layer 30 includes first filaments 32a generally arranged transversely relative to second filaments 32b. In one example, the first filaments 32a and the second filaments 32b are woven metal wires, such as a square-woven mesh. The gaps between the first filaments 32a and the second filaments 32b provide open space for the flow of the first reactant through the porous layer 30 to the anode 24.

In the disclosed arrangement, the rigidized foil support 14 operates in a severely corrosive environment from a dual exposure to fuel on one side and oxidant on another side. The thickness of the perforated support sheet 28 and the thickness of the separator sheet 26 also contribute to the severity of the conditions, since fuel (and in particular hydrogen) may more readily diffuse through thin structures at the operating temperature of the solid oxide fuel cell, whereas thicker structures limit core exposure. In this regard, at least the perforated support sheet 28 and the separator sheet 26 are comprised of a nickel-based alloy to resist corrosion. The porous layer 30 may be comprised of the nickel-based alloy. However, the porous layer may also be comprised of another type of alloy, such as stainless steel.

The nickel-based alloy is highly resistant to corrosion under the severe conditions and configuration of the fuel cell 10. If the perforated support sheet 28, the separator sheet 26, the porous layer, or each were to form an oxide scale, the mechanical integrity and electrical conductivity of the rigidized foil support 14 could be diminished. However, the nickel-based alloy resists corrosion under the dual exposure environment to thereby extend the operational life of the fuel cell 10.

In some examples, the nickel-based alloy may include a predominant amount of nickel (e.g., a greater amount of nickel in the composition than any other element), chromium, and at least one element of cobalt, molybdenum, aluminum, iron, or tungsten. For instance, the nickel-based alloy may be a grade of INCONEL®, HASTELLOY®, or HAYNES®, and in particular Haynes 230, Haynes S, Hastelloy Alloy C-4, Hastelloy Alloy C-276, Hastelloy Alloy C-22, Haynes 282, Nicrofer 6616, and the like. Iron-base alloys of substantial Ni content, such as austenitic steels, may also be effective for some applications that do not require long life at operating temperatures. Examples of such alloys include AISI 302, 303, 304, 309, 310, 316, 317, 321 and 347, UNS S34565, UNS N06626, Allegheny Steel AL-6NX and the like.

In one example, the nickel-based alloy of the given thickness is thermally compatible with the electrode 16. That is, thermal expansion coefficients of the selected nickel-based alloy and the electrode 16 are a relatively good match such that thermal cycling of the fuel cell 10 does not cause damage to the electrode 16. However, in other examples, a functionally gradient layer may be used between the electrode 16 and the nickel-based alloy to provide a transition from higher coefficient of thermal expansion to lower coefficient of thermal expansion and thereby mitigate the mismatch.

One example nickel-based alloy composition includes approximately 57 wt % nickel, 22 wt % chromium, 2 wt % molybdenum, 14 wt % tungsten, 0.4 wt % silicon, 0.5 wt % manganese, 0.3 wt % aluminum, a non-zero amount of cobalt up to 5 wt %, and a non-zero amount of iron up to 3 wt %. The example compositions may also include trace amounts of boron, columbium, yttrium, and lanthanum, each generally in an amount between 0.01 wt % and 0.2 wt %. The given compositions may also include impurities that do not affect the properties of the alloy or elements that are unmeasured or undetectable in the alloy, although in other examples the compositions may include only the given elements. The term "approximately" as used in this description relative to the given compositions refers to possible variation in the given value, such as a ±5% tolerance around the value.

Figure 2:
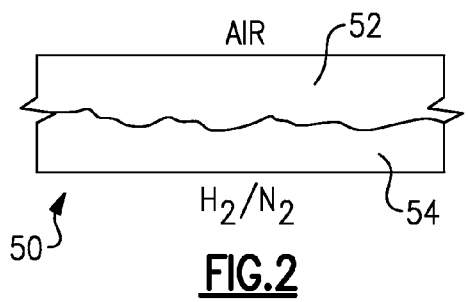
FIG. 2 shows a partial view of stainless steel foils exposed to dual atmosphere

The nickel-based alloy of the perforated support sheet 28 and the separator sheet 26 are highly resistant to corrosion under the severe conditions and the configuration of the fuel cell 10 compared to stainless steel, such as CROFER 22 APU®. FIG. 2 illustrates a portion 50 of a foil sheet made of stainless steel after about 70 hours of dual exposure (air on one side and 50% hydrogen, 50% nitrogen on the other side) at a temperature of 600° C. (1112° F.). The side exposed to air oxidized to form an oxide scale 52 on stainless steel 54.

Figure 3:
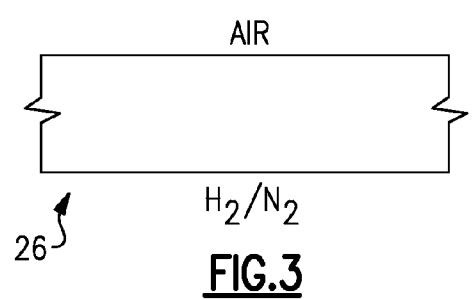
FIG. 3 shows a partial view of stainless steel foil exposed to dual atmosphere

FIG. 3 illustrates a portion of the separator sheet 26 after exposure to identical conditions as the portion 50 made of stainless steel. The nickel-based alloy of the separator sheet 26 showed essentially no oxidation after more than 600 hours of exposure. The perforated support sheet 28 is expected to have similar corrosion resistance.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A fuel cell comprising:
    an electrode including a solid oxide electrolyte between an anode and a cathode;
    an interconnect layer; and
        a rigidized foil support between the electrode and the interconnect layer, the rigidized foil support including:
        a porous layer having first and second opposed sides, the first side oriented toward the electrode and the porous layer including fluid delivery passages;
        a perforated support sheet interfacially bonded to the first side of the porous layer;
        a solid, continuous separator sheet interfacially bonded to the second side of the porous layer, the perforated support sheet and the separator sheet comprising a nickel-based alloy; and
    an inlet fluid communication port for providing a reactant into the rigidized foil support, the fluid delivery passages of the porous layer connecting the inlet fluid communication port with the perforated support sheet such that reactant can be delivered from the porous layer through perforations of the perforated support sheet to the electrode.

2. The fuel cell as recited in claim 1, wherein the nickel-based alloy approximately includes 57 wt % nickel, 22 wt % chromium, 2 wt % molybdenum, 14 wt % tungsten, 0.4 wt % silicon, 0.5 wt % manganese, 0.3 wt % aluminum, a non-zero amount of cobalt up to 5 wt %, and a non-zero amount of iron up to 3 wt %.

3. The fuel cell as recited in claim 1, wherein the solid oxide electrolyte is an electrolyte selected from the group consisting of a doped ceria, a gallate, and a stabilized zirconia, and the separator sheet and the perforated support sheet are each comprised of a metal foil having a thickness of 10-150 micrometers.

4. The fuel cell as recited in claim 1, wherein the porous layer is comprised of stainless steel.

5. The fuel cell as recited in claim 1, wherein the nickel-based alloy includes a predominant amount of nickel, chromium, and at least one element selected from the group consisting of cobalt, molybdenum, aluminum, iron, tungsten, and combinations thereof.

6. The fuel cell as recited in claim 1, wherein the separator sheet is also comprised of the nickel-based alloy.

7. The fuel cell as recited in claim 6, wherein the porous layer is also comprised of the nickel-based alloy.

8. The fuel cell as recited in claim 1, wherein the interconnect layer includes first reactant supply passages and the rigidized foil support includes second reactant supply passages, the first reactant supply passages and a second reactant supply passages opening to, respectively, the cathode and the anode.

9. A fuel cell comprising:
 a support structure including:
  a porous layer having first and second opposed sides, the porous layer including fluid delivery passages;
  a perforated support sheet interfacially bonded to the first side of the porous layer;
  a solid, continuous separator sheet interfacially bonded to the second side of the porous layer, the perforated support sheet and the separator sheet comprising a nickel-based alloy; and
  an inlet fluid communication port configured to provide a reactant into the support structure, the fluid delivery passages of the porous layer connecting the inlet fluid communication port with the perforated support sheet such that reactant can be delivered from the porous layer through perforations of the perforated support sheet.

10. A support structure for a fuel cell, comprising:
 a porous layer having first and second opposed sides, the porous layer including fluid delivery passages;
 a perforated support sheet interfacially bonded to the first side of the porous layer;
 a solid, continuous separator sheet interfacially bonded to the second side of the porous layer, the perforated support sheet and the separator sheet comprising a nickel-based alloy; and
 an inlet fluid communication port for providing a reactant into the support structure, the fluid delivery passages of the porous layer connecting the inlet fluid communication port with the perforated support sheet such that reactant can be delivered from the porous layer through perforations of the perforated support sheet.

11. The fuel cell as recited in claim 9, wherein the support structure includes an outlet fluid communication port configured to discharge the reactant from the support structure.

12. The fuel cell as recited in claim 9, wherein the nickel-based alloy approximately includes 57 wt % nickel, 22 wt % chromium, 2 wt % molybdenum, 14 wt % tungsten, 0.4 wt % silicon, 0.5 wt % manganese, 0.3 wt % aluminum, a non-zero amount of cobalt up to 5 wt %, and a non-zero amount of iron up to 3 wt %.

13. The fuel cell as recited in claim 9, wherein the solid, continuous separator sheet and the perforated support sheet are each comprised of a metal foil.

14. The fuel cell as recited in claim 13, wherein the metal foil comprises a thickness of 10-150 micrometers (394-5906 microinches).

15. The fuel cell as recited in claim 9, wherein the porous layer comprises woven filaments.

16. The fuel cell as recited in claim 15, wherein the porous layer is comprised of nickel-based alloy.

17. The fuel cell as recited in claim 15, wherein the porous layer is comprised of stainless steel.

18. The fuel cell as recited in claim 9, wherein the nickel-based alloy includes a predominant amount of nickel, chromium, and at least one element selected from the group consisting of cobalt, molybdenum, aluminum, iron, tungsten, and combinations thereof.

19. The fuel cell as recited in claim 8, wherein the porous layer is also comprised of the nickel-based alloy.

\* \* \* \* \*